United States Patent [19]
Masaki et al.

[11] Patent Number: 5,159,321
[45] Date of Patent: Oct. 27, 1992

[54] PEN-TYPE COMPUTER INPUT DEVICE

[75] Inventors: Takeshi Masaki, Kawasaki; Ryuichi Toyoda, Yokohama; Kimikatsu Sato, Sagamihara, all of Japan

[73] Assignee: Matsushita Electric Industrial Co., Ltd., Osaka, Japan

[21] Appl. No.: 568,817

[22] Filed: Aug. 17, 1990

[30] Foreign Application Priority Data

Aug. 18, 1989 [JP] Japan .................................. 1-213385
Nov. 14, 1989 [JP] Japan .................................. 1-295898

[51] Int. Cl.⁵ .............................................. G09G 3/02
[52] U.S. Cl. .................... 340/706; 340/709; 178/18; 178/19
[58] Field of Search ............ 178/18, 19; 382/59, 382/60; 340/707, 706, 709; 73/861.77, 861.78, 517 R; 33/1 M

[56] References Cited

U.S. PATENT DOCUMENTS

| | | | |
|---|---|---|---|
| 3,269,190 | 8/1966 | Laman | 74/471 XY |
| 3,304,434 | 2/1967 | Koster | 250/231.14 |
| 3,376,551 | 4/1968 | Armbruster | 382/13 |
| 3,395,589 | 8/1968 | Gersten | 74/471 XY |
| 3,541,521 | 11/1970 | Koster | 364/521 |
| 3,541,541 | 11/1970 | Engelbart | 340/710 |
| 3,835,453 | 9/1974 | Narayanan | 382/13 |
| 4,345,239 | 8/1982 | Elliott | 382/59 |
| 4,522,062 | 6/1985 | Peters | 73/517 R |
| 4,550,316 | 10/1985 | Whetstone et al. | 340/710 |

FOREIGN PATENT DOCUMENTS

| | | |
|---|---|---|
| 0097807 | 1/1984 | European Pat. Off. . |
| 0143581 | 6/1985 | European Pat. Off. . |
| 0120424 | 6/1985 | Japan . |
| 8604704 | 8/1986 | PCT Int'l Appl. . |
| 8802895 | 4/1988 | PCT Int'l Appl. . |

OTHER PUBLICATIONS

L. D. Larsen, IBM Technical Disclosure Bulletin, Quadrant Check for Signature Verification, Sep. 1977, pp. 1538-1539.

*Primary Examiner*—Alvin E. Oberley
*Assistant Examiner*—Jick Chin
*Attorney, Agent, or Firm*—Lowe, Price, LeBlanc & Becker

[57] ABSTRACT

A pen-type computer input device is used to move a cursor on the display of a computer system or enter data such as of figures, letters, numerals, or the like into a computer system. The pen-type computer input device includes a shank, a pen nib disposed on the tip end of the shank, and a sensor disposed in the shank, for detecting the directions in which and the distances by which the pen nib moves in two perpendicular directions in a plane, in response to movement of the pen nib, and for producing an output signal representative of the directions and distances. Since the sensor can detect the distance by which the pen nib moves without any mechanical motion transmitting mechanism incorporated in the pen nib, the pen-type computer input device may be small in size and can be handled with ease.

2 Claims, 6 Drawing Sheets

PEN-TYPE COMPUTER INPUT DEVICE

BACKGROUND OF THE INVENTION

The present invention relates to a pen-type computer input device for moving a cursor on the display of a computer system or entering data such as of figures, letters, numerals, or the like into a computer system.

Various computer input devices such as a keyboard, a mouse, a digitizer, a light pen, a tablet, etc. are used in the art of computers. The mouse is a device for relatively moving a cursor displayed on a CRT. The mouse can move the cursor at high speed and can also freely draw a figure or the like on the CRT display through relatively simple manual operation. Mouses now in use are largely classified into two groups. In one group, the mouse comprises a rotatably supported ball whose angular displacement is used to detect the distance which is traversed by the mouse. In the other category, the mouse is moved over a board which is marked with a checkerboard pattern, and the distance by which the mouse is moved is detected by a photosensor.

Mouses may be used in different ways depending on the software of computer systems with which the mouses are associated. Basically, when a desired figure or line is to be drawn using a mouse, the mouse is moved to move a cursor on a computer display along a path corresponding to such a figure or line. Since it is difficult to move a mouse over small distances because of its size and structure, and it is impossible to monitor any movement of the mouse directly, it is highly difficult to enter small figures, letters, and numerals through the mouse. The other conventional computer input devices are also incapable of entering small figures and free curves desirably.

SUMMARY OF THE INVENTION

In view of this aforesaid problems of the conventional computer input devices, it is an object of the present invention to provide a pen-type computer input device which is small in size, can easily be handled just like a writing implement, and hence can be used to enter figures, letters, numerals, etc. into a computer to which the input device is connected, in the exact pattern followed by the input device.

To achieve the above object, there is provided a pen-type computer input device comprising a shank having a tip end, a pen nib disposed on the tip end, and sensor means disposed in the shank, for detecting the directions in which and the distances by which the pen nib moves in two perpendicular directions in a plane, in response to movement of the pen nib, and for producing an output signal representative of the directions and distances. Since the sensor can detect the distance by which the pen nib moves without any mechanical motion transmitting mechanism incorporated in the pen nib, the pen-type computer input device may be small in size and can be handled with ease.

The above and other objects, features and advantages of the present invention will become more apparent from the following description when taken in conjunction with the accompanying drawings in which preferred embodiments of the present invention are shown by way of illustrative example.

DETAILED DESCRIPTION

Like or corresponding parts are denoted by like or corresponding reference numerals throughout views.

A pen-type computer input device according to a first embodiment of the present invention will first be described below with reference to FIGS. 1 through 6.

Figure 1:
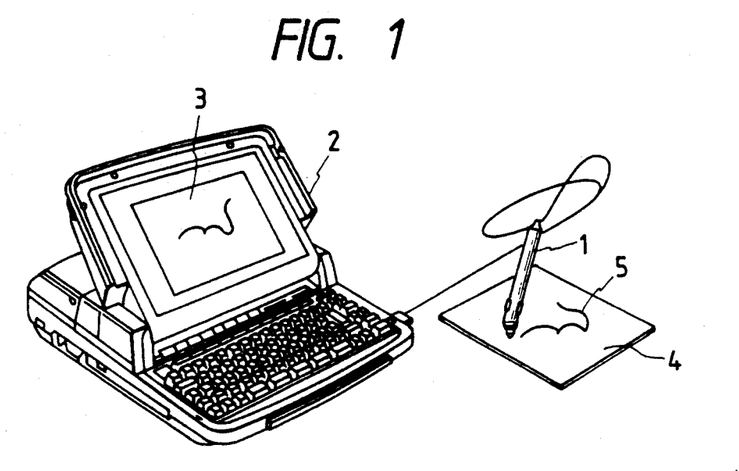
FIG. 1 is a perspective view of a pen-type computer input device according to a first embodiment of the present invention and a computer to which the pen-type computer input device is connected.

As shown in FIG. 1, a pen-type computer input device 1 is connected to a computer 2 which has a display 3. In operation, a free curve 5, which may represent any figure, letter, numeral, or symbol, drawn on a recording sheet 4 by the pen-type computer input device 1 is displayed on the display 3 of the computer 2.

Figure 2:
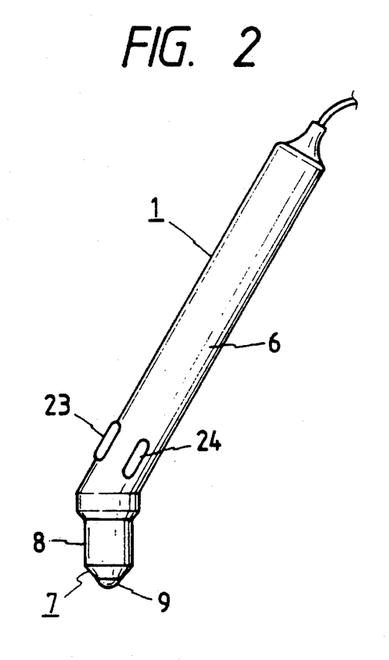
FIG. 2 is an elevational view of the pen-type computer input device shown in FIG. 1.
Figure 3:
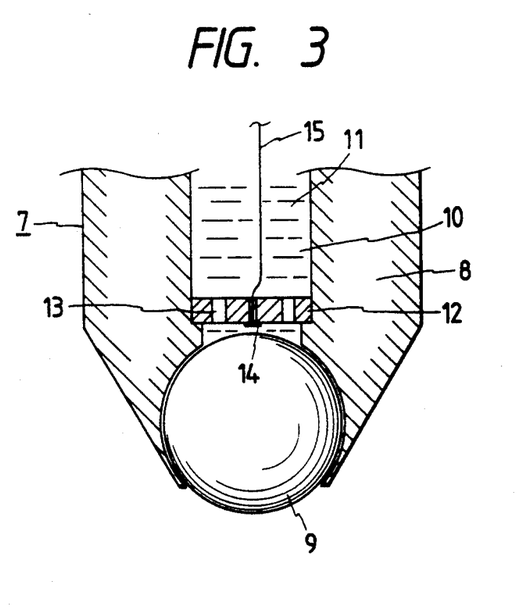
FIG. 3 is an enlarged fragmentary cross-sectional view of the pen-type computer input device according to the first embodiment.

As illustrated in FIGS. 2 and 3, the pen-type computer input device 1 comprises a shank 6 including a pen nib 7 on its tip end. A steel ball 9 is rotatably supported in a holder 8 of the pen nib 7, the ball 9 being freely rotatable in any direction. The holder 8 has an ink chamber 10 defined therein behind the distal end thereof and storing an ink 11, which can be applied to the outer circumferential surface of the ball 9. The ink chamber 10 has a wall 12 immediately behind the ball 9, the wall having ink passage holes 13 defined therein. A sensor 14 is mounted on the wall 12 near the ball 9, and held out of contact with the ball 9. To the sensor 14, there is connected a lead wire 15 for transmitting a detected signal to the computer 2.

Figure 4A:
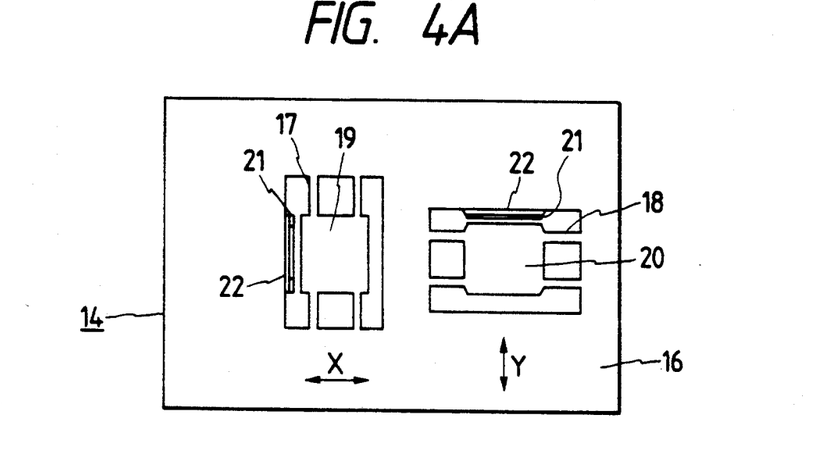
FIG. 4A is an enlarged plan view of a sensor of the pen-type computer input device according to the first embodiment.
Figure 4B:
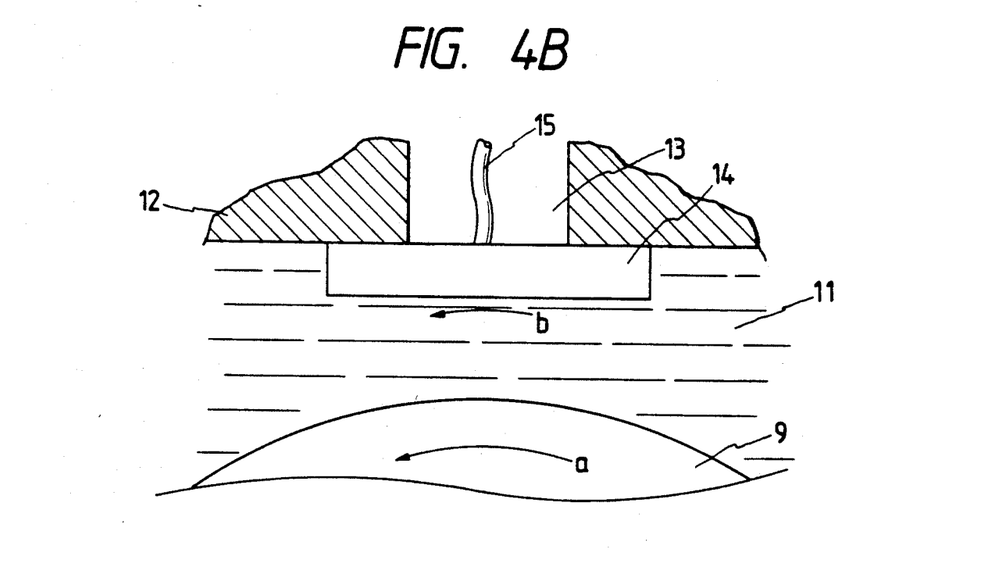
FIG. 4B is an enlarged fragmentary view showning the relationship between a ball and the sensor.

The sensor 14 can detect the directions in which and the distances by which the ball 9 moves X and Y axes which extend perpendicularly to each other in a plane. More specifically, as shown in FIG. 4A, the sensor 14 comprises a silicon substrate 16, an X-parallel spring 17 which can be displaced only in an X-axis direction (horizontal direction in FIG. 4A), a Y-parallel spring 18 which can be displaced only in a Y-axis direction (vertical direction in FIG. 4A), a displaceable region 19 associated with the X-parallel spring 17, a displaceable region 20 associated with the Y-parallel spring 18, and two electrodes 21 coupled to sides of the displaceable regions 19, 20, respectively, through insulating layers 22. The electrodes 21 serve to detect displacements of the displaceable regions 19, 20 as changes in electrostatic capacitance.

As shown in FIG. 2, the shank 6 has two input control switches 23, 34 which are positioned near the tip end of the shank 6 so that the switches 23, 24 can easily be operated on by fingers when the shank 6 is gripped by hand.

Operation of the pen-type computer input device 1 will now be described below.

Figure 5:
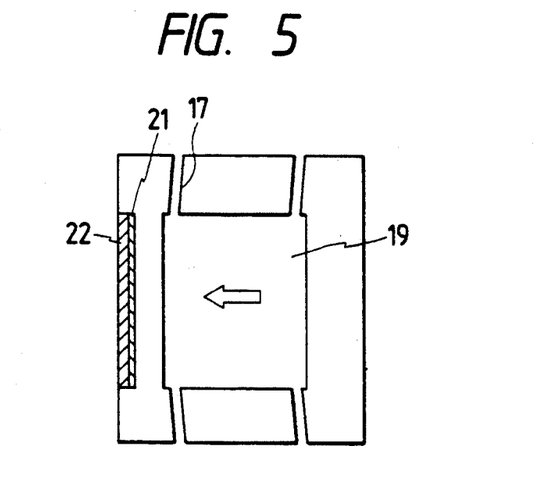
FIG. 5 is a view showing the manner in which the sensor operates.
Figure 6:
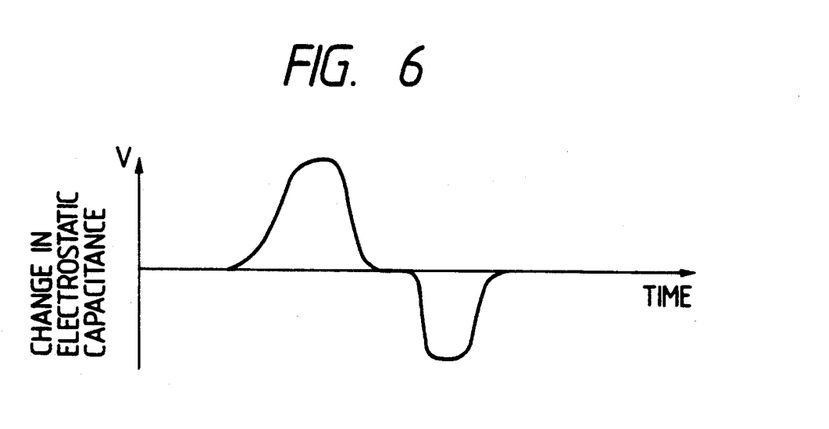
FIG. 6 is a diagram showing an output signal from the sensor in the first embodiment.

The shank 6 of the pen-type computer input device 1 is gripped, and a free curve 5 is drawn on the recording sheet 4 with the pen-type computer input device 1 while the ball 9 is being pressed against the recording sheet 4, as shown in FIG. 1. The pen-type computer input device now produces an output signal representative of the direction and distance of movement of the ball 9. If the ball 9 rotates in the direction indicated by the arrow a in FIG. 4B, e.g., in the X-axis direction, then the ink 11 is caused to flow by the rotation of the ball 9. Particularly, the ink 11 flows in the direction indicated by the arrow b in the vicinity of the sensor 14. At this time, the X-parallel spring 17 is deformed by forces due to the viscosity of the ink 11. The manner in which the X-parallel spring 17 is deformed is shown in FIG. 5. When the displaceable region 19 of the X-parallel spring 17 is displaced, the electrostatic capacitance between the displaceable region 19 and the electrode 21 varies. The flow of the ink 11 can be measured by detecting such a change in the electrostatic capacitance. FIG. 6 shows a detected output signal from the sensor 14 when the ball 9 moves in the X-axis direction (horizontal direction in FIG. 4. In FIG. 6, the change in the electrostatic capacitance is converted into a voltage, and the voltage is zero when the sensor 14 is in an equilibrium position. Therefore, the output signal from the sensor 14 changes its signs, i.e., varies from a negative value to a positive value or vice versa, when the ball 9 changes its direction of movement. The magnitude of the voltage of the output signal is proportional to the speed at which the ball 9 moves. Accordingly, the direction in which the ball 9 moves is indicated by the sign of the output signal, and the distance by which the ball 9 moves is indicated by the integral of the output signal.

When the ball 9 rotates in the Y-axis direction, the Y-parallel spring 18 is deformed due to the flow of the ink 11, and the direction and distance of movement of the ball 9 can be detected on the basis of a change in the electrostatic capacitance between the displaceable region 20 and the electrode 22.

The output signal from the sensor 14, which is representative of the direction and distance of movement of the ball 9, is then sent to the computer 2, which moves the cursor on the display 3 for thereby displaying a free curve corresponding to the free curve 5 that is drawn on the recording sheet 4 by the pen-type computer input device 1. As the ball 9 thus rotates and moves, the ink 11 is transferred from the pen-type computer input device 1 onto the recording sheet 4. If the X-Y directions of the pen-type computer input device 1 agree with the X-Y directions of display 3 of the computer 2, the user can easily check if the displayed curve is the same as the drawn curve.

The pen-type computer input device 1 can be used not only to draw curves such as figures, letters, numerals, symbols, or the like, but also to control the cursor displayed on the display 3.

A pen-type computer input device according to a second embodiment of the present invention will be described below with reference to FIG. 7.

Figure 7:
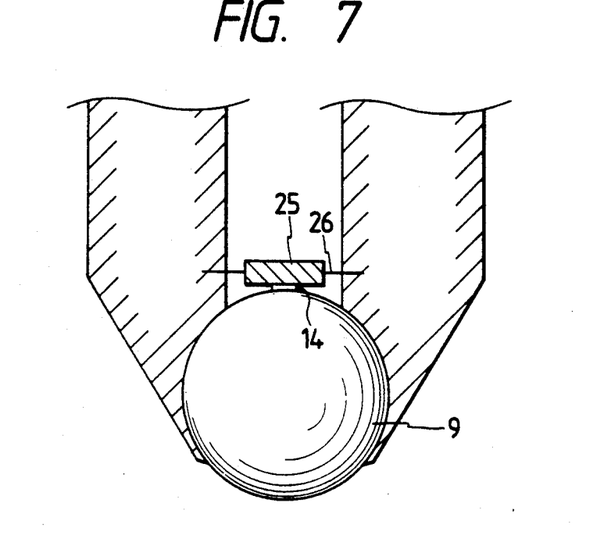
FIG. 7 is an enlarged fragmentary cross-sectional view of the tip end of a pen-type computer input device according to a second embodiment of the present invention.

As shown in FIG. 7, a support member 25 is held by a spring 26 in the holder 8 immediately behind the ball 9, and a sensor 14 is supported on the support member 25 and held in frictional contact with the ball 9. The sensor 14 is identical to the sensor 14 shown in FIG. 4A, and is pressed against the ball 9 by the spring 26 under a constant pressure. The sensor 14 has a very small surface area contacting the ball 9. Therefore, the sensor 14 can make effective detection even if its contacting surface is flat. However, it is possible for the sensor 14 to have a recessed surface matching the curvature of the ball 9 for more accurate detection. The other details and the process of detecting the direction and distance of movement of the ball 9 according to the second embodiment are the same as those of the first embodiment, and will not be described in detail.

In the first and second embodiments, the sensor 14 can be fabricated in a small size, using the fine precision fabrication process for silicon semiconductor fabrication. For example, the sensor 14 can be of a size having a surface area of 50 $\mu$m $\times$ 50 $\mu$m. Accordingly, the pen-type computer input device can easily be constructed. A signal processing circuit associated with the sensor 14 may also be fabricated on the sensor substrate by the semiconductor fabrication process. Consequently, the pen-type computer input device is greatly reduced in size.

With the above embodiments, the sensor 14 for detecting the direction in which the ball 9 moves and the distance by which the ball 9 moves, based on the flow of the ink 11 or the frictional force acting on the sensor 14, is reduced in size, and hence can detect small magnitudes of movement of the ball 9. Furthermore, the pen-type computer input device can easily be handled just like a pen-shaped writing implement. As a result, the pen-type computer input device 1 allows the user to enter various figures, letters, numerals, and other symbols into the computer 2 accurately as desired.

A pen-type computer input device according to a third embodiment of the present invention will be described below with reference to FIGS. 8 through 10.

Figure 8:
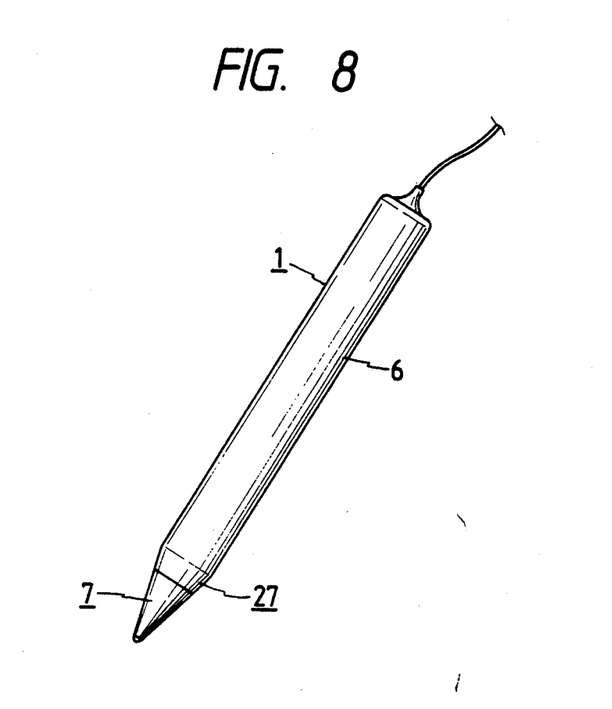
FIG. 8 is an elevational view of a pen-type computer input device according to a third embodiment of the present invention.
Figure 9:
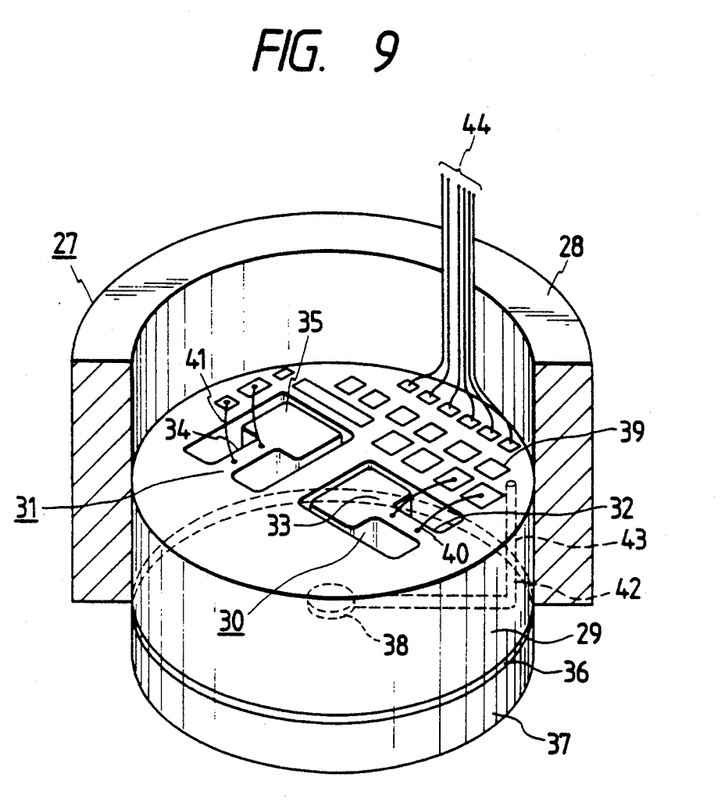
FIG. 9 is a perspective view, partly broken away, of a sensor unit of the pen-type computer input device according to the third embodiment.

As shown in FIG. 8, a pen-type computer input device 1 comprises a shank 6 including a pen nib 7 on its tip end, with a sensor unit 27 interposed between the shank 6 and the pen nib 7. As shown in FIG. 9, the sensor unit 27 is mechanically coupled to the shank 6 by a cylindrical holder 28. The sensor unit 27 includes a silicon substrate 29 fixedly mounted in the holder 28 and having an X-axis pendulum 30 and a Y-axis pendulum 31 which are formed therein perpendicularly to each other. The X-axis pendulum 30 comprises a leaf spring 32 joined at a proximal end to the substrate 29 and a weight 33 joined to the distal end of the leaf spring 32. Similarly, the Y-axis pendulum 31 comprises a leaf spring 34 joined at a proximal end to the substrate 29 and a weight 35 joined to the distal end of the leaf spring 34. The weights 33, 35 are supported respectively by the leaf springs 32, 34 such that the weights 33, 35 can freely swing only in the X- and Y-axis directions. The leaf springs 32, 34 contain impurities dispersed in the silicon material thereof. Therefore, when the weights 33, 35 swing, the leaf springs 32, 34 are strained, changing their own electric resistance. A pressure-sensitive substrate 37 is attached to the front surface (lower surface in FIG. 9) of the silicon substrate 29 through the intermediary of an elastic sheet 36. The pressure-sensitive substrate 37 is coupled to the pen nib 7, so that the elastic sheet 36 can be elastically expanded and contracted depending on the pressure which acts on the pen nib 7 pressed against the recording sheet 4. The pen nib 7 may be of any type insofar as it can draw any desired patterns on a sheet of paper.

The pressure-sensitive substrate 37 and the silicon substrate 29 support contacts 38 which can be brought into contact with each other when the elastic sheet 36 is contracted. The silicon substrate 29 supports on its rear surface (upper surface in FIG. 9) an electric signal processing circuit 39 which detects the direction and distance of movement of the pen-type computer input device 1 based on strains of the leaf springs 32, 34 upon swinging movement of the weights 33, 35 of the X- and Y-axis pendulum 30, 31. The electric signal processing circuit 39 also serves to process an output signal from a pressure-sensitive switch which detects the pressure acting on the pen nib 7 from the recording sheet 4. The electric signal processing circuit 39 is integrated on the silicon substrate 29. The leaf springs 32, 34 are electrically connected to the electric signal processing circuit 39 by signal wires 40, 41, and the contacts 38 are connected to the electric signal processing circuit 39 by a signal wire 43 extending through a hole 42 which is defined through the silicon substrate 29. The electric signal processing circuit 39 is connected to the computer 2 by a cable 44.

Figure 10:
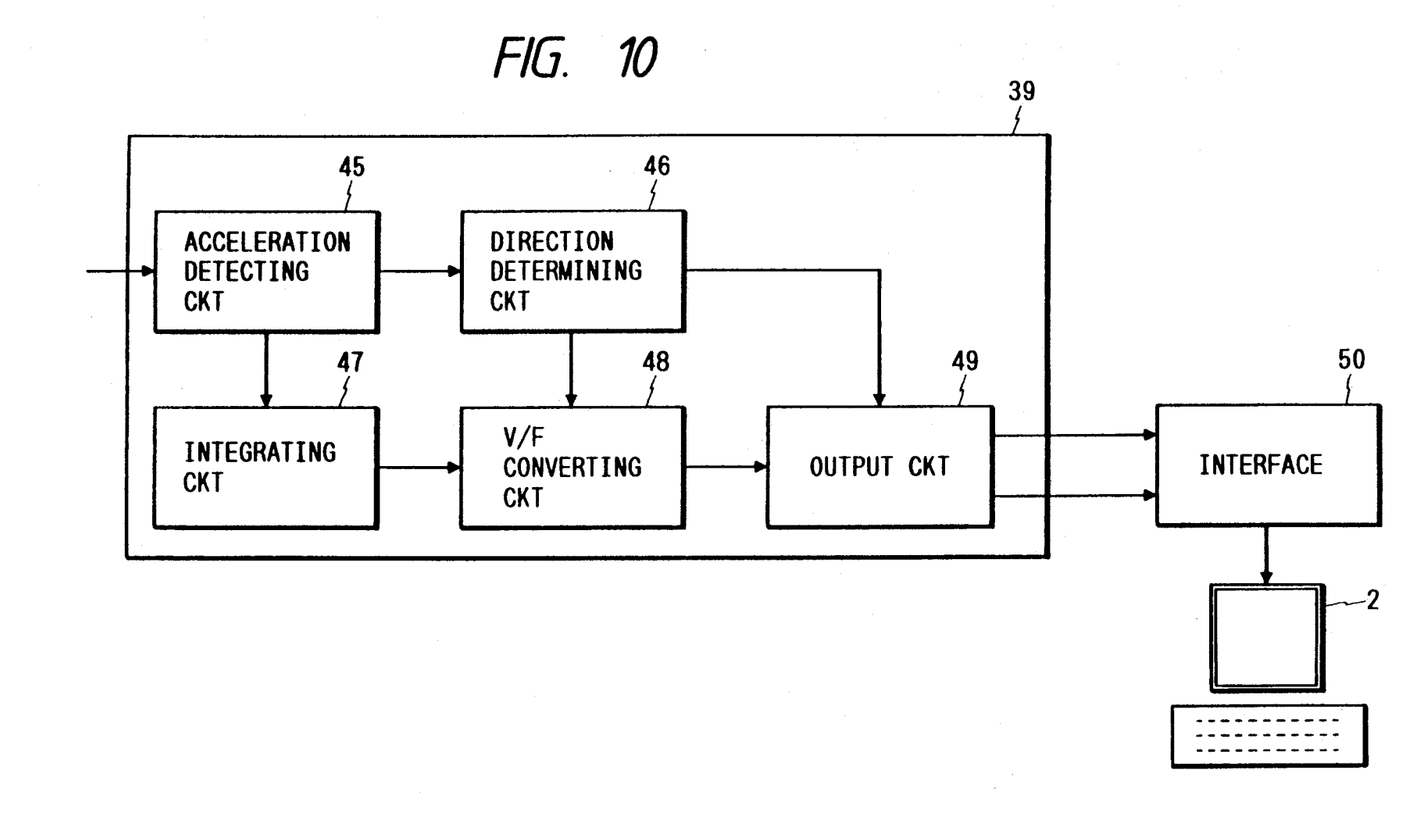
FIG. 10 is a block diagram of an electric signal processing circuit of the pen-type computer input device according to the third embodiment.

The electric signal processing circuit 39 connected to the computer 2 is shown in block form in FIG. 10. As shown in FIG. 10, the electric signal processing circuit 39 includes an acceleration detecting circuit 45 for detecting an acceleration applied to the weight 33 or 35 due to the strain of the leaf spring 32 or 34, a direction determining circuit 46 for determining the direction in which the pen-type computer input device 1 moves, based on an acceleration signal produced by the acceleration detector 45, an integrating circuit 47 for converting the acceleration signal into a speed signal, a voltage-to-frequency converting circuit 48, and an output circuit 49 for selecting output signals depending on a direction signal from the direction determining circuit 46.

The pen-type computer input device 1 according to the third embodiment operates as follows:

The shank 6 of the pen-type computer input device 1 is gripped, and a free curve 5 is drawn on the recording sheet 4 with the pen-type computer input device 1 while the ball 8 is being pressed against the recording sheet 4, as shown in FIG. 1. Depending on the pressure applied to the pen nib 7 by the recording sheet 4, the elastic sheet 36 is expanded or contracted. When the elastic sheet 36 is contracted or compressed, the contacts 38 on the pressure-sensitive substrate 37 and the silicon substrate 29 are brought into contact with each other, and a signal is sent over the signal wire 43 to the electric signal processing circuit 39. As the shank 6 and hence the pen-type computer input device 1 move, the weights 33, 35 swing due to acceleration, thereby straining the leaf springs 32, 34. The strains of the leaf springs 32, 34 are detected as changes in their electric resistances, which are transmitted over the signal wires 40, 41 to the electric signal processing circuit 39. As shown in FIG. 10, the changes in the electric resistances of the leaf springs 32, 34, which are caused by the strains thereof, are converted into an acceleration signal by the acceleration detecting circuit 45. The acceleration signal is then processed by the direction determining circuit 46 and the integrating circuit 47 so that the direction and distance of movement of the pen-type computer input device 1 can be detected. The integrating circuit 47 also produces a speed signal from the acceleration signal.

The distance by which the pen-type computer input device 1 moves can be entered into the computer 2 in two different ways. According to one method, the distance traversed by the pen-type computer input device 1 is converted into a numerical value, which is applied to the computer 2. According to the other process, the distance is quantized into pulses per unit of distance, and the pulses are applied to the computer 2. The electric signal processing circuit 39 employs the latter signal processing method, by which the magnitude of voltage which is represented by the speed signal from the integrating circuit 47 is converted into a pulse frequency. The voltage-to-frequency converting circuit 48 converts a change in the voltage into a change in the frequency. Since the number of pulses corresponds to the distance by which the pen-type computer input device 1 moves, the frequency of the pulses is proportional to the speed at which the pen-type computer input device 1 moves. When the pen-type computer input device 1 moves at a high speed, for example, the frequency of pulses into which the voltage of the speed signal is converted is high. Depending on the direction signal from the direction determining circuit 46, the output circuit 49 outputs a pulse signal from the voltage-to-frequency converting circuit 48 with a positive or negative sign. The electric signal processing circuit shown in FIG. 10 processes signals produced in one of the X- and Y-axis directions. Signals produced in the other direction can also be processed in the same circuit arrangement as the elastic signal processing circuit 49. The pulse signal thus processed is transmitted through an interface 50 to the computer 2. In the computer 2, the cursor displayed on the display 3 is moved, thus displaying a free curve corresponding to the free curve 5 drawn by the pen-type computer input device 1.

A specific example of resolution of the pen-type computer input device 1 is given below.

When the pen-type computer input device 1 moves over a distance of 5 cm at a speed of 10 cm per second, if the cursor displayed on the display 3 moves 1 dot in response to movement of the pen-type computer input device 1 over a distance of 0.1 mm, then the electric signal processing circuit 39 should produce 500 pulses per 0.5 second. Therefore, the frequency which corresponds to a speed signal of 10 cm per second is 1,000 Hz. Since the signals to be processed are not relatively high in frequency, therefore, no linearity problem arises. The ratio of voltage-to-frequency conversion can freely be selected. Thus, if the frequency of 1,000 Hz is doubled, the resolution is also doubled, and a figure whose size is twice the size of the original figure (the area is four times larger) can be entered into the computer.

With the present invention, as described above, the pen-type computer input device has a sensor for detecting accelerations in two perpendicular directions in a plane, and another sensor for detecting when the pen nib is pressed against a recording sheet or the like, the sensors being accommodated in the tip end of the shank, and means for processing a signal from the acceleration sensor to determine the distance in which the pen-type computer input device moves in the plane. The signal processing means includes an integrating circuit for converting a detected signal from the acceleration sensor into a speed signal, a voltage-to-frequency converting circuit for converting the voltage of the speed signal into a corresponding frequency, and a circuit for determining the direction in which the pen-type computer input device moves. Therefore, the distance by which the pen-type computer input device moves can be detected without any mechanical motion transmitting means in the tip end of the shank. As the sensor unit for detecting the distance of movement of the pen-type computer input device is of an integrated construction which is very small in size, it can easily be incorporated in the tip end of the shank. The pen-type computer input device can be handled with utmost ease, and can enter desired figures, letters, numerals, and other symbols accurately as desired. Since the resolution of the distance by which the pen-type computer input device moves is determined by the conversion ratio of the voltage-to-frequency converting circuit, the resolution can be selected as desired. Inasmuch as the pen-type computer input device provides higher resolutions, it can enter figures, letters, numerals, and symbols drawn in smaller spaces into the computer. It is also possible to lower the resolution and enter figures, letters, numerals, and symbols drawn in larger spaces into the computer.

Although certain preferred embodiments have been shown and described, it should be understood that many changes and modifications may be made therein without departing from the scope of the appended claims.

What is claimed is:

1. A pen-type computer input device comprising:
a shank having a tip end;
a pen nib disposed on said tip end, said pen nib having a ball rotatably supported therein and an ink chamber for transferring ink around said ball to a surface against which the ball is held, in response to rotation of said ball; and
sensor means disposed in said tip end and held in contact with the ink in said ink chamber, for detecting the direction in which said ball rotates and the distance by which said ball moves, based on a displacement caused by a viscous flow of ink in response to rotation of said ball, and for producing an output signal representative of the direction in which said ball rotates and the distance by which said ball moves; said sensor means comprising a silicon substrate, two springs mounted on said silicon substrate and movable in two respective perpendicular directions in a plane, and detecting means for detecting said displacement as displacements of said springs, and two springs and said detecting means being formed on said silicon substrate by silicon semiconductor fabrication.

2. A pen-type computer input device comprising:
a shank having a tip end:
a pen nib disposed on said tip end, said pen nib having a ball rotatably supported therein; and
sensor means disposed in said tip end and held in frictional contact with said ball, for detecting the direction in which said ball rotates and the distance by which said ball moves, based on a displacement caused by frictional forces produced between said ball and said sensor means in response to rotation of said ball, and for producing an output signal representative of the direction in which said ball rotates and the distance by which said ball moves, based on a change in electrostatic capacitance caused by said displacement; said sensor means comprising a silicon substrate, two springs mounted on said silicon substrate and movable in two respective perpendicular directions in a plane, and detecting means for detecting said displacement as displacements of said springs, and two springs and said detecting means being formed on said silicon substrate by silicon semiconductor fabrication.

* * * * *